(12) United States Patent
Imai et al.

(10) Patent No.: US 7,080,175 B2
(45) Date of Patent: Jul. 18, 2006

(54) NETWORK SYSTEM

(75) Inventors: Norihiro Imai, Sunto-gun (JP);
Kazunori Okada, Hiratsuka (JP)

(73) Assignee: OMRON Corpration, Kyoto (JP)

( * ) Notice: Subject to any disclaimer, the term of this patent is extended or adjusted under 35 U.S.C. 154(b) by 555 days.

(21) Appl. No.: 10/390,561

(22) Filed: Mar. 13, 2003

(65) Prior Publication Data

US 2003/0220961 A1 Nov. 27, 2003

(30) Foreign Application Priority Data

Mar. 15, 2002 (JP) ............................. 2002-073174
Feb. 28, 2003 (JP) ............................. 2003-055006

(51) Int. Cl.
G06F 13/36 (2006.01)
G06F 13/42 (2006.01)

(52) U.S. Cl. ...................................... 710/113; 709/208
(58) Field of Classification Search ................ 710/100, 710/300, 3, 107, 110, 113; 709/208, 238, 709/248, 253
See application file for complete search history.

(56) References Cited

U.S. PATENT DOCUMENTS

| | | | |
|---|---|---|---|
| 4,751,672 A | 6/1988 | Yamada | |
| 4,888,726 A | 12/1989 | Struger | |
| 5,072,374 A * | 12/1991 | Sexton et al. | 709/208 |
| 5,159,673 A * | 10/1992 | Sackmann et al. | 709/216 |
| 5,444,847 A * | 8/1995 | Iitsuka | 710/107 |
| 5,528,768 A | 6/1996 | Bechstein | |
| 5,642,350 A * | 6/1997 | Dailey | 370/439 |
| 5,978,593 A | 11/1999 | Sexton | |
| 6,782,436 B1 * | 8/2004 | Baker | 710/43 |
| 6,867,749 B1 * | 3/2005 | II et al. | 345/1.1 |
| 2001/0034755 A1* | 10/2001 | Aizono et al. | 709/201 |
| 2002/0183870 A1* | 12/2002 | Misawa et al. | 700/86 |
| 2003/0126222 A1* | 7/2003 | Peterson et al. | 709/208 |
| 2004/0138786 A1* | 7/2004 | Blackett et al. | 700/295 |

FOREIGN PATENT DOCUMENTS

| | | | |
|---|---|---|---|
| JP | 2002063083 A | * | 2/2002 |
| WO | 90/04833 | | 5/1990 |

* cited by examiner

*Primary Examiner*—Rehana Perveen
*Assistant Examiner*—Trisha Vu
(74) *Attorney, Agent, or Firm*—Beyer Weaver & Thomas LLP

(57) ABSTRACT

A network system is formed with a parent station and programmable controllers and a programmable display devices serving as child stations connected to a single general-purpose serial communication circuit. Whichever child station received the token from the parent station outputs a command. Data are exchanged between the programmable display device and any of the programmable controllers by command-response communication. Data are exchanged among the programmable controllers by data link operations.

12 Claims, 17 Drawing Sheets

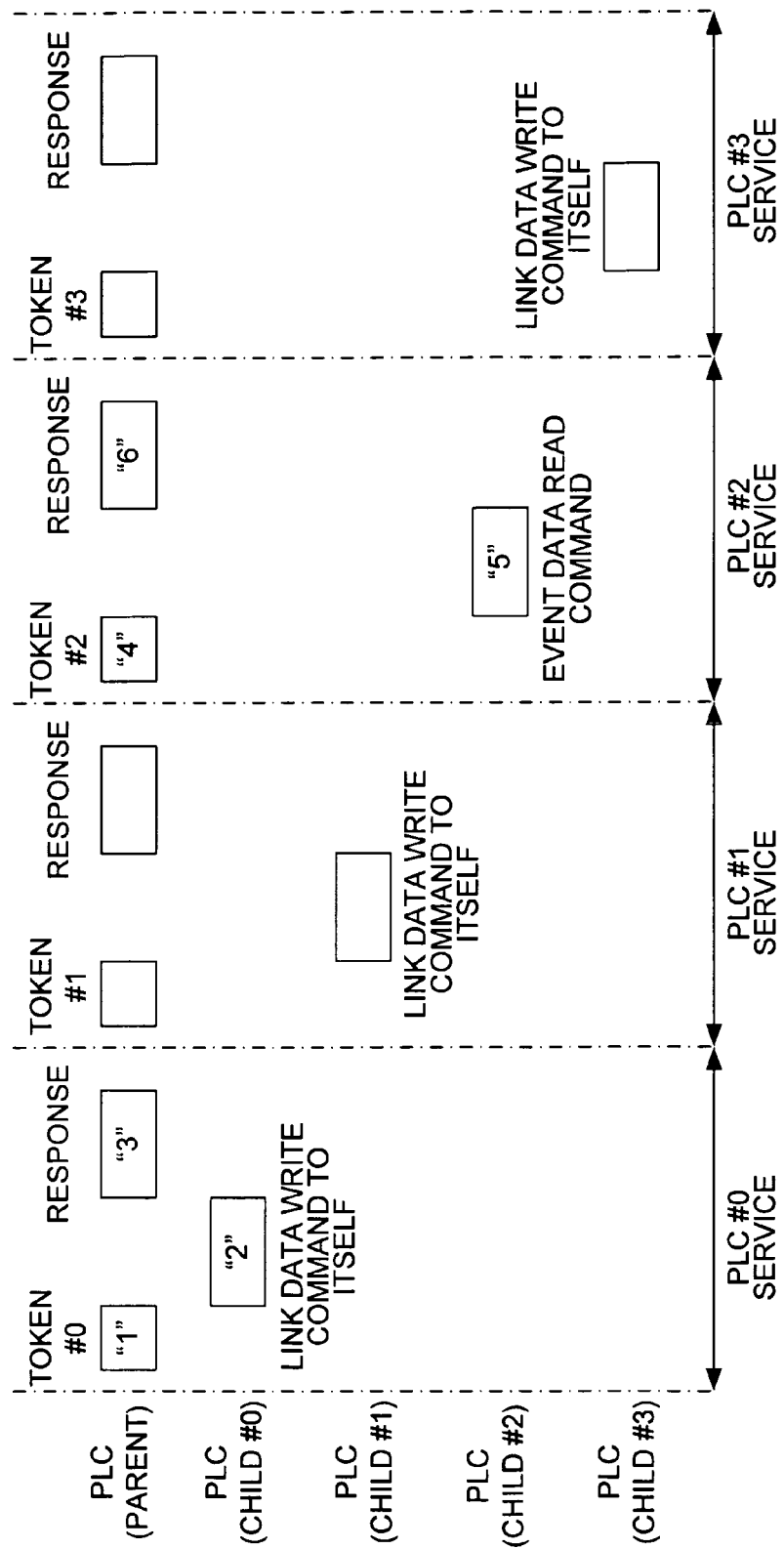

NETWORK SYSTEM

BACKGROUND OF THE INVENTION

This invention relates to a network system.

It has been known in factory automation (FA) to connect a plurality of programmable controllers (PLC) through a network for controlling a FA system as a whole by operating them in cooperation and in synchronism. In such an application, the plurality of PLC may be connected to a network with general-purpose serial communication ports. Such a network connecting a plurality of PLC may be provided with a programmable terminal (PT) which may be a programmable display device for displaying the contents of internal memories of the units that form these PLC (for storing data on the operations of these units as well as data for controlling their operations) and changing the contents of such internal memories such that each of these PLC can be controlled.

When a network containing PLC and PT is formed by using a general-purpose serial communication circuit, the so-called data link function (to be described below) is used among the PLC such that data can be shared in common. If data are to be exchanged between PLC and PT by command-response communication as an event, it has been known, as shown in FIG. 1, to connect each PLC 1 to one network 2 corresponding to the general-purpose serial communication port of each PLC 1 and to each PT 3 to another network 4 corresponding to the general-purpose serial communication port of each PT 3. These networks 2 and 4 are then connected to the serial communication ports of another PLC 5 referred to as the parent station. Even where a network including only PLC is to be formed with a general-purpose serial communication circuit, if data link and command-response communications as events are to be carried out, such a network was conventionally formed as shown in FIG. 1 with the PT 3 therein replaced by PLC, separately providing a network for the data link and another network for command-response communication as event. In the structure shown in FIG. 1 the parent station (PLC 5) usually plays the role of controlling the communication between each PLC 1 connected to the network 2 and the parent station PLC 5. In this case, each PLC 1 connected to the network 2 is referred to as a child station. The parent station PLC 5 also serves to control the communication between each PT 3 connected to the network 4 and the parent station (PLC 5). In this situation, each PT 3 connected to the network 4 is also referred to as a child station.

With a network system thus structured, each PLC 1 transmits and receives data by data link operations through the first network 2. In the above, "data link" means the operation and function of constantly holding data (link data) on specified areas of internal memories of nodes (such as PLC) in common among the nodes on a network such that no user-prepared communication program is needed for sharing data among the nodes. Examples of data link format include the method of each PLC 1 mutually supplying (reflecting) data and the method of only the parent station reflecting the data of all child stations (PLC) while each child station reflects the data on the parent station. In the network system shown in FIG. 1, the parent station 5 serves also as a relay such that data can be exchanged between a PLC 1 connected to the first network 2 and a PT 3 connected to the second network 4.

Each PT 3 may be adapted to transmit a read/write command to the parent station PLC 5 as a relay as an event of data exchange different from the data link when a right to communicate is received, say, by obtaining a token from the parent station PLC 5. If the received command is a read command, the PT 3 receives from the parent station PLC 5 a response corresponding to this event and obtains the information stored at the address of the parent station PLC 5 specified by this event. The information corresponding to the memory of the parent station PLC 5 can thus be displayed on the monitor screen of the PT 3.

With PLC 5 serving as the parent station, preliminarily set data from each PLC 1 are collected by the parent station PLC 5 and hence each PT 3 can collect such collected data from PLC 5.

Since the PLC 1 and the PT 3 of a prior art network system must be connected to the parent station PLC 5 with mutually different general-purpose serial communication circuits, there are problems of the following kinds. Firstly, if a data link is formed among the PLC 1 and a PT 3 is to be connected to this data link, the parent station PLC 5 serving as a relay requires two general-purpose serial communication ports. A same problem also occurs with a network comprised only of PLC and formed with general-purpose serial communication circuits when a command-response communication is carried out with a data link as an event.

In view of the trend for miniaturization, however, there are PLC with only one general-purpose serial communication port. In a situation as described above, a decision must be made as to which system has a higher priority, whether or not to add units for more ports although the cost would be increased or whether or not to adopt a type of two ports on a rank.

When some data are to be held in common between the PT 3 and the PLC 1, furthermore, the data must travel through the parent station PLC 5 serving as a relay, and the process becomes more complicated and a high-speed transmission becomes impossible. If one of the PT 3 wants to read data from a PLC 1, for example, such data are first collected by data link by the parent station PLC 5 and the data-requesting PT 3 must transmit a read command to it as an event. If it is desired to have data transmitted from a PT 3 to a PLC 1, as another example, the data are first transmitted to the parent station PLC 5 and then sent to the PLC 1 by data link. Thus, the load on the parent station PLC 5 becomes heavy, resulting in increased complexity of problems and delay in data processing.

As shown in FIG. 2, memory areas to be data-linked are preliminarily specified. In other words, not all memory areas of PLC 1 and 5 are data-linked. When a PT 3 attempts to access a data-linked area, a cumbersome relay routine must be followed, as explained above. If data are to be transmitted to or received from an area not data-linked, however, the routine is even more cumbersome and the delay involved is even longer.

If a data item in area A in one of the PLC 1, as shown in FIG. 2, is to be sent to a PT 3, a user program is initially carried out within this PLC 1 to transfer this data item to area B which is already assigned to the data link. Thereafter, this data item is transferred to area C of the parent station 5 assigned to the same data link. This transfer is carried out at the timing of the data link between the PLC 1 and the parent station 5. The parent station 5 carries out a user program to transfer the received data item from area C to another area D from which it is convenient to transfer data to the PT 3. Thus, the parent station 5, upon receiving a read command from the PT 3, returns the data item from its area D to the requesting PT 3. In other words, a much more complicated routine must be carried out for this kind of data transfer. Moreover, each of the PLC 1 is required to have a user program prepared and downloaded for such internal transfer of data. Thus, the memory area to be finally accessed within the PLC 1 cannot be simply changed. Similar problem remains if the PT 3 in the above example is replaced by a PLC.

SUMMARY OF THE INVENTION

It is therefore an object of this invention to provide a network system comprising a network of both PT and PLC or only of PLC (without PT) with a simplified network structure where data link communications and command-response communications as an event are both carried out such that the data transfer can be carried out speedily and each PT can access any memory area of any of the PLC.

A network system embodying this invention, with which the above and other objects can be accomplished, may be characterized as being of the type comprising a plurality of programmable controllers and a programmable display device connected to a general-purpose serial communication circuit, one of the programmable controllers being a parent station, the rest of the programmable controllers and the programmable display device being each a child station, each one of the child stations being adapted to transmit a command when a token issued by the parent station is received thereby. More programmable display devices may be connected to the circuit. Data are exchanged between the parent station and any of the child stations by carrying out a command-response communication (or so-called "event communication" treated as an "event") but data are shared in common by the so-called data link format (or by carrying out so-called "data link operations") among the programmable controllers.

According to a second embodiment of the invention, the network of the same type is provided with two service functions and these two functions are carried out in a random or predetermined order. The first of the service functions is characterized wherein data are exchanged between the parent station and the programmable display device by a command-response communication and data are shared in common by data link among the programmable controllers. The second of the service functions is characterized wherein data are shared in common by data link among the programmable controllers and the programmable display device. Thus, the programmable display device can obtain and give data from or to a programmable controller easily by the data link function. Thus, there is no need for a communication program to be provided by the user to exchange data among the child stations simply and quickly.

According to a third embodiment of the invention, the network of the same type is characterized wherein data are exchanged between the programmable display device and any of the programmable controllers by a command-response communication and data are shared in common by data link among the programmable controllers. In general, any other devices may be connected to the general-purpose serial communication circuit to which the programmable controllers and display device of the network are connected. According to this embodiment, the programmable display device can transmit a command to any of the programmable controllers to obtain data from or give data to the latter. In other words, data can be exchanged without passing them through the parent station and hence data can be exchanged quickly and smoothly. Since the communication is by way of a write or read command instead of through the data link formalism, any memory area can be selectively accessed. Thus, the degree of freedom in data exchange is increased.

According to a fourth embodiment of the invention, the network of the same type is characterized wherein data are exchanged among the programmable controllers by a command-response communication and data are shared in common by data link between the parent station and the programmable display device. In summary, a network system according to this invention can be formed at a reduced cost with only one general-purpose serial communication port.

According to a fifth embodiment of the invention, a network is formed with a plurality of programmable controllers connected to a single general-purpose serial communication circuit, one of these programmable controllers being a parent station, the rest being each a child station, each one of the child stations being adapted to transmit a command when a token issued by the parent station is received thereby. Data are shared in common by data link among the parent station and some of the rest of the programmable controllers. Data are also exchanged between the parent station and the others of the programmable controllers, which do not share data with the parent station by data link, by a command-response communication.

A programmable display device, instead of a programmable controller, may play the role of parent station. Such a network system embodying the invention may be characterized as comprising a single general-purpose serial communication circuit and a programmable display device which serves as a parent station and a plurality of programmable controllers each serving as a child station, each one of the child stations being adapted to transmit a command when a token issued by the parent station is received thereby, data being exchanged between the parent station and some of the programmable controllers by a command-response communication, data being shared in common by data link operations between the parent station and the rest of the child stations.

BRIEF DESCRIPTION OF THE DRAWINGS

FIG. 18 is a diagram for showing operations of the fifth example of shown in FIG. 17.

DETAILED DESCRIPTION OF THE INVENTION

Figure 1:
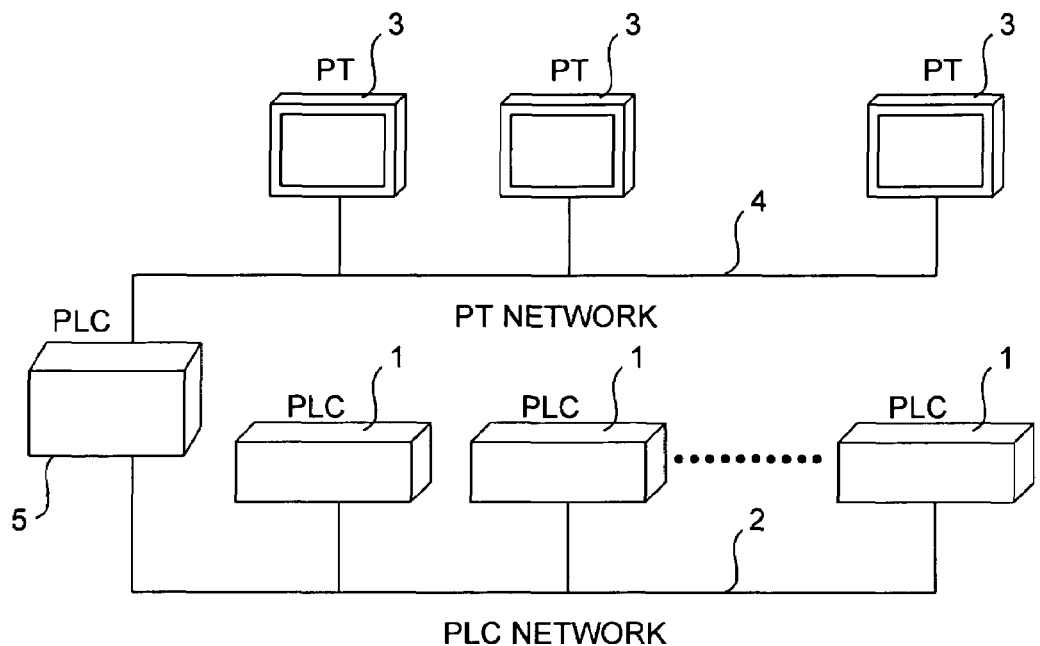
FIG. 1 is a diagram showing an example of prior art network system.
Figure 2:
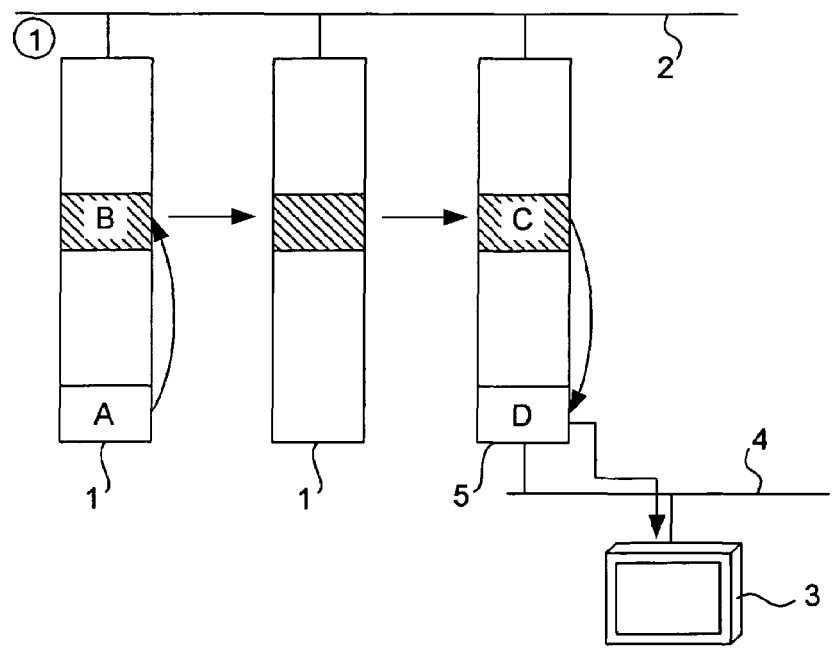
FIG. 2 is a diagram showing a routine of data transfer in a prior art network system.
Figure 3:
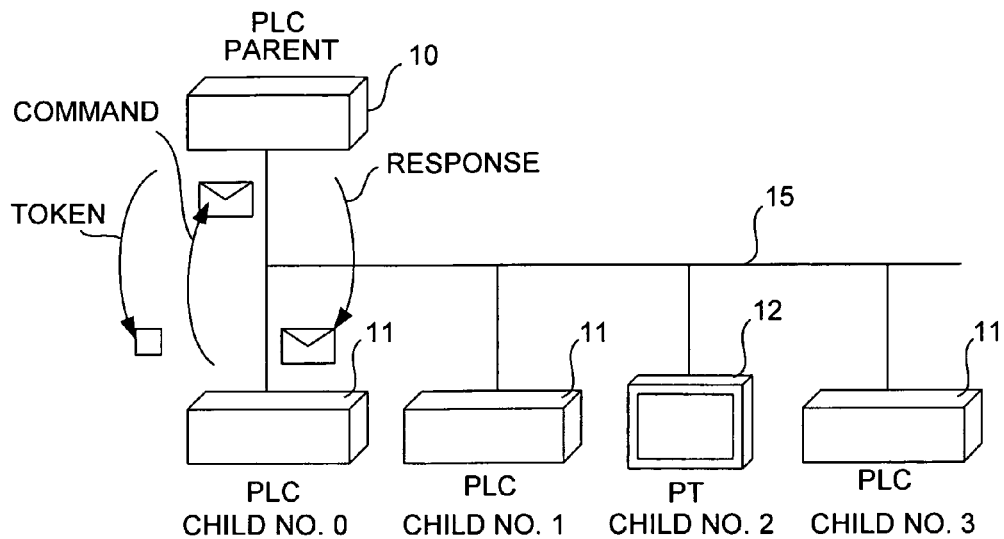
FIG. 3 is a diagram showing an example of network system embodying this invention.

The invention is described next by way of an example. FIG. 3 shows an example of network system embodying this invention, including a PLC 10 serving as a parent station, other PLC 11 as child stations and a PT 12 (which is a kind of programmable display device and also a child station) are connected to a single network 15 (although the numbers of the PLC 11 and PT 12 may be varied). This network 15 is comprised of a general-purpose serial communication circuit (such as RS422/485) such that only one general-purpose serial communication port is required for connecting not only the child stations PLC 11 and PT 12 but also the parent station PLC 10 to the network 15.

Figure 4:
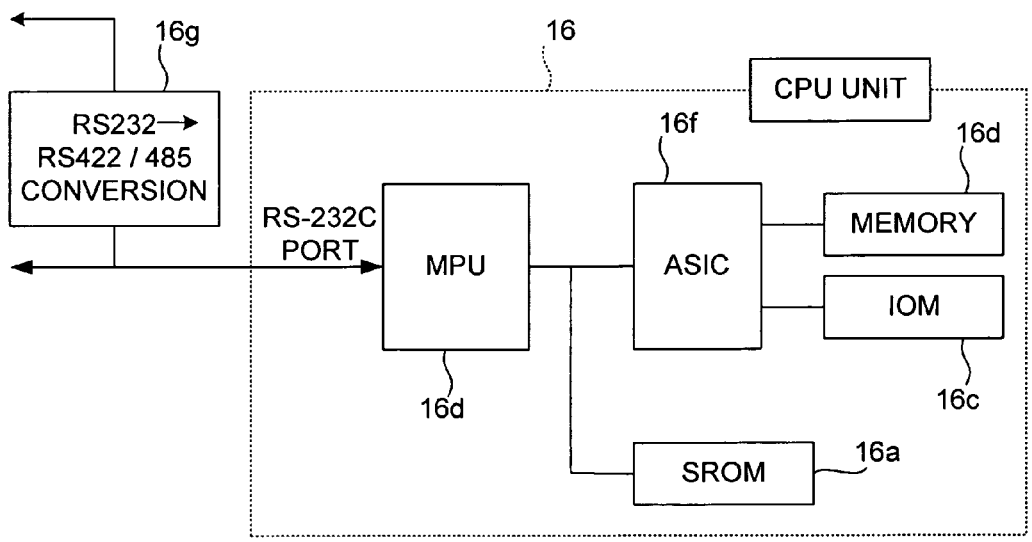
FIG. 4 is an example of block diagram of the CPU unit.

PLC 10 and 11 are formed by connecting a plurality of units (such as a CPU unit, an I/O unit and a power source unit) each unitized for a different function. FIG. 4 shows the internal structure of the CPU unit 16, including a SROM 16a which is a memory for storing a system program for controlling the CPU unit 16, a set memory 16b for storing parameters to be preliminarily set for making the operations of the PLC variable and an I/O memory 16c for storing the contents of data link or data exchanged with the I/O unit. Also included is a microprocessor MPU 16d for controlling the CPU unit 16 as a whole with functions of controlling the data link by carrying out the system program stored in the SROM 16a and according to the contents of the set memory 16b and reading and writing data from and into the I/O memory 16c (although it is ASIC 16f that actually controls the read/write operations of data from and into the I/O memory 16c). An external device 16g for conversion to RS-422/485 is also provided for connecting a plurality of RS-232C ports. Alternatively, RS-422/485 port may be included in the CPU unit 16 instead of RS-232C ports.

Figure 6:
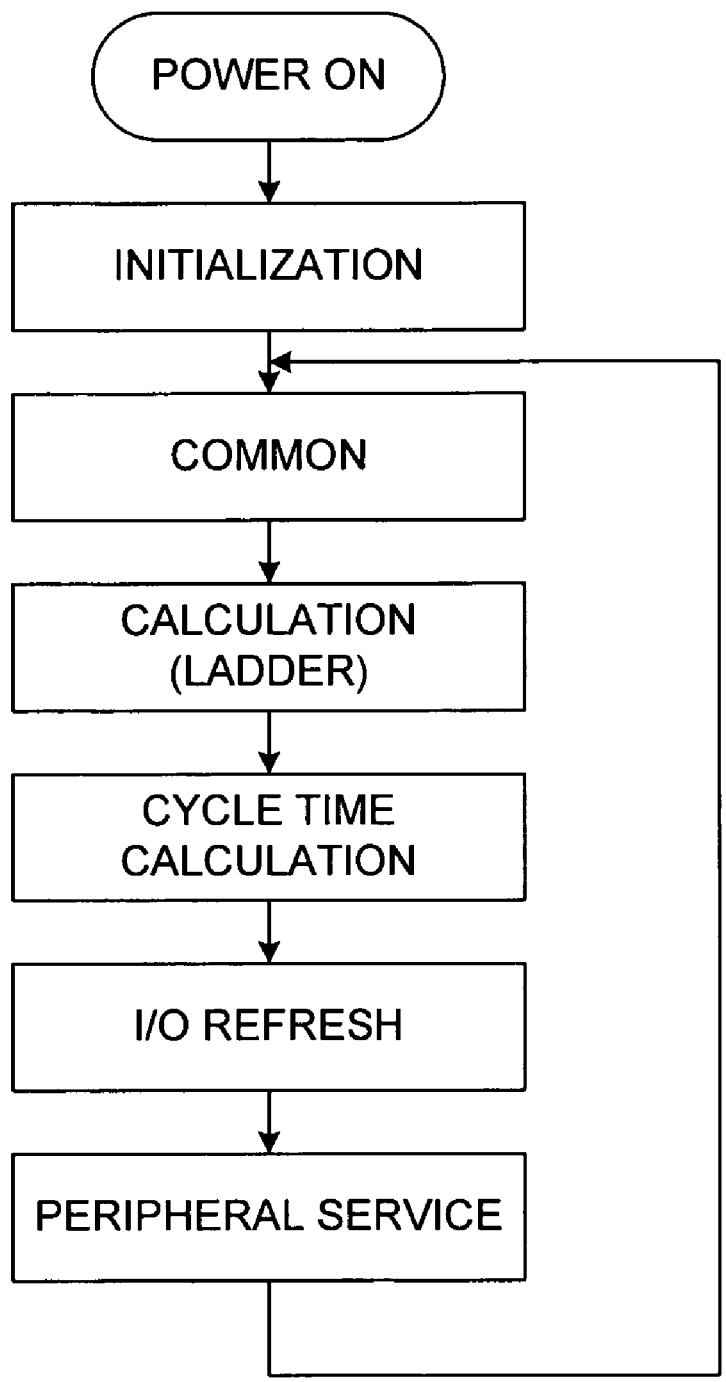
FIG. 6 is an example of flowchart showing the processing by the PLC.

The CPU unit 16 thus structured is adapted to carry out a cyclic process according to the system program, say, by sequentially and repeatedly carrying out a common process, a calculating process, a cycle time calculating process, an I/O refresh process and a peripheral service process, as shown in FIG. 6 after an initialization process is carried out as power is switched on. The common process may include the process of checking abnormality in the condition of the battery (not shown) for holding data in the set memory 16b when the power source for the CPU unit is switched off. The calculating process may include the process of carrying out a user program created by the user by using a ladder language and stored preliminarily in a specified memory (not shown) in the CPU unit prior to the execution of the PLC. The cycle time calculating process may be for measuring the time required to carry out one cycle of the cyclic process described above and storing it in a specified memory. The I/O refresh process means the process of storing data of an input unit (a kind of I/O unit) in an I/O memory 16c and transmitting data of the I/O memory 16c to an output unit (another kind of I/O unit to which a valve and an actuator may be connected). The peripheral service process means processes, for example, of carrying out communications with other PLC or PT through a general-purpose serial communication port such as the RS-232C port or RS-422/485.

Figure 5:
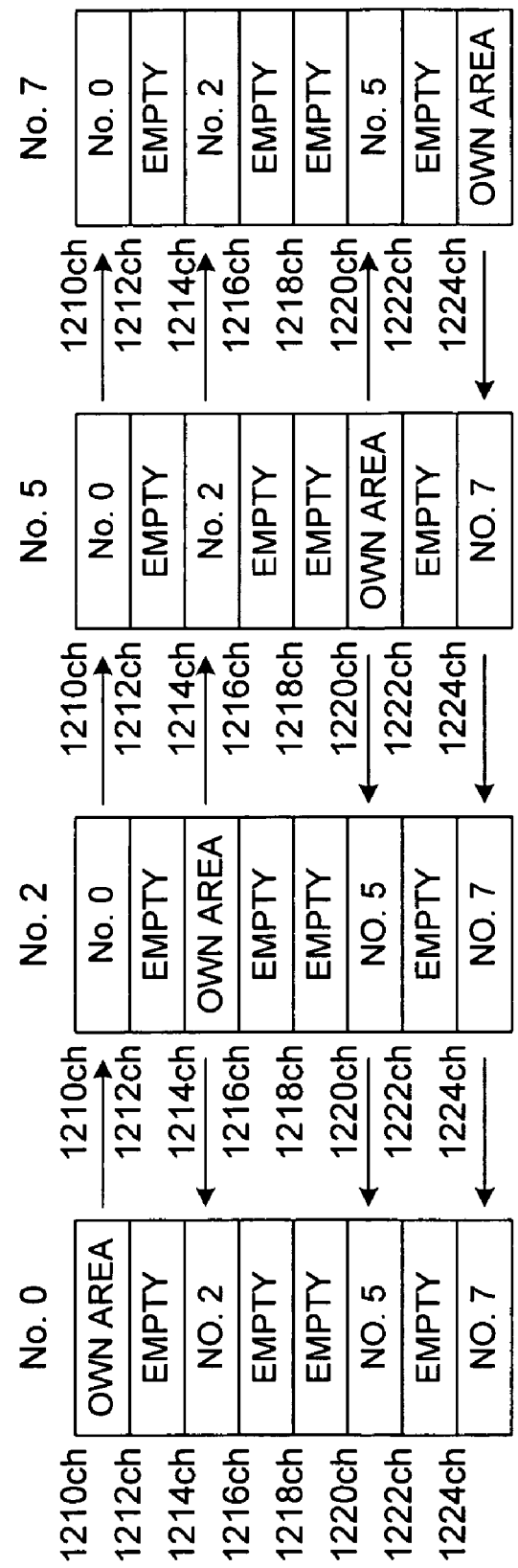
FIG. 5 is a diagram of a data link.

What has been referred to as "data link" is a method by which data are shared among a plurality of "nodes" such as PLC each with a memory (I/O memory). Data are cyclically exchanged among them such that they share the same data in common. The I/O data of other nodes are taken into the I/O memory of each node at a specified timing such that data can be commonly shared with the other nodes. FIG. 5 shows an example of data link, areas for data link (for storing common data) being assigned in the memory of each node (parent and child stations). The memory areas to be used by the nodes are determined and may be assigned a same address. In the example shown in FIG. 5, addresses 1210ch and 1211ch are assigned to Node No. 0, addresses 1214ch and 1215ch are assigned to Node No. 2, addressed 1220ch and 1221ch are assigned to Node No. 5 and addresses 1224ch and 1225ch are assigned to Node No. 7. Although FIG. 5 shows an example where 2 channels are assigned for transmission for each node, the memory assignment at each node will change if the number of channels is varied.

At each node, data are written in at an appropriate timing (say, for I/O refresh process done cyclically) in the area for storing its own node. Next, at the time of the peripheral service process to be carried out cyclically, the data item stored in its own area is transmitted to another node. Since a similar process is carried out at each of the other nodes, shared data items are also received at the same time, and these received data items are each stored at a correspondingly assigned area. Consider Node No. 0, for example. The shared data controlled by itself (over which it has the right to update) are stored at 1210ch and 1211ch and transmitted to the other nodes (Nodes Nos. 2, 5 and 7) by the peripheral service process. Since shared data controlled by these other nodes (Nodes Nos. 2, 5 and 7) are being transmitted from them, they are received and stored at corresponding addresses, that is, data stored in the own area of No. 2 are stored at 1214ch and 1215ch of No. 0, data stored in the own area of No. 5 are stored in 1220ch and 1221ch. In this manner, every time mutually shared data are received by each node, data from the other nodes are stored in their own memory areas. In other words, data are constantly being shared among the nodes on the network. Thus, whenever it is desired to make use of a data item from another node, it has only to access its own memory area to obtain the shared data item. The program for carrying out such a process is preliminarily prepared on the side of the system and it is not necessary for the user to create such a communication program for sharing data among the nodes.

In the example above, the memory addresses are matching among the nodes but this is not necessary. If they do not match, a table may be prepared for showing the correspondence (regarding the node numbers and the address numbers) so as to be consulted when a shared data item from another node is saved in its own memory area.

The hardware structure is the same for PLC 10 and 11 and may be also the same with prior art PLC. Thus, detailed description will be omitted.

Figure 7:
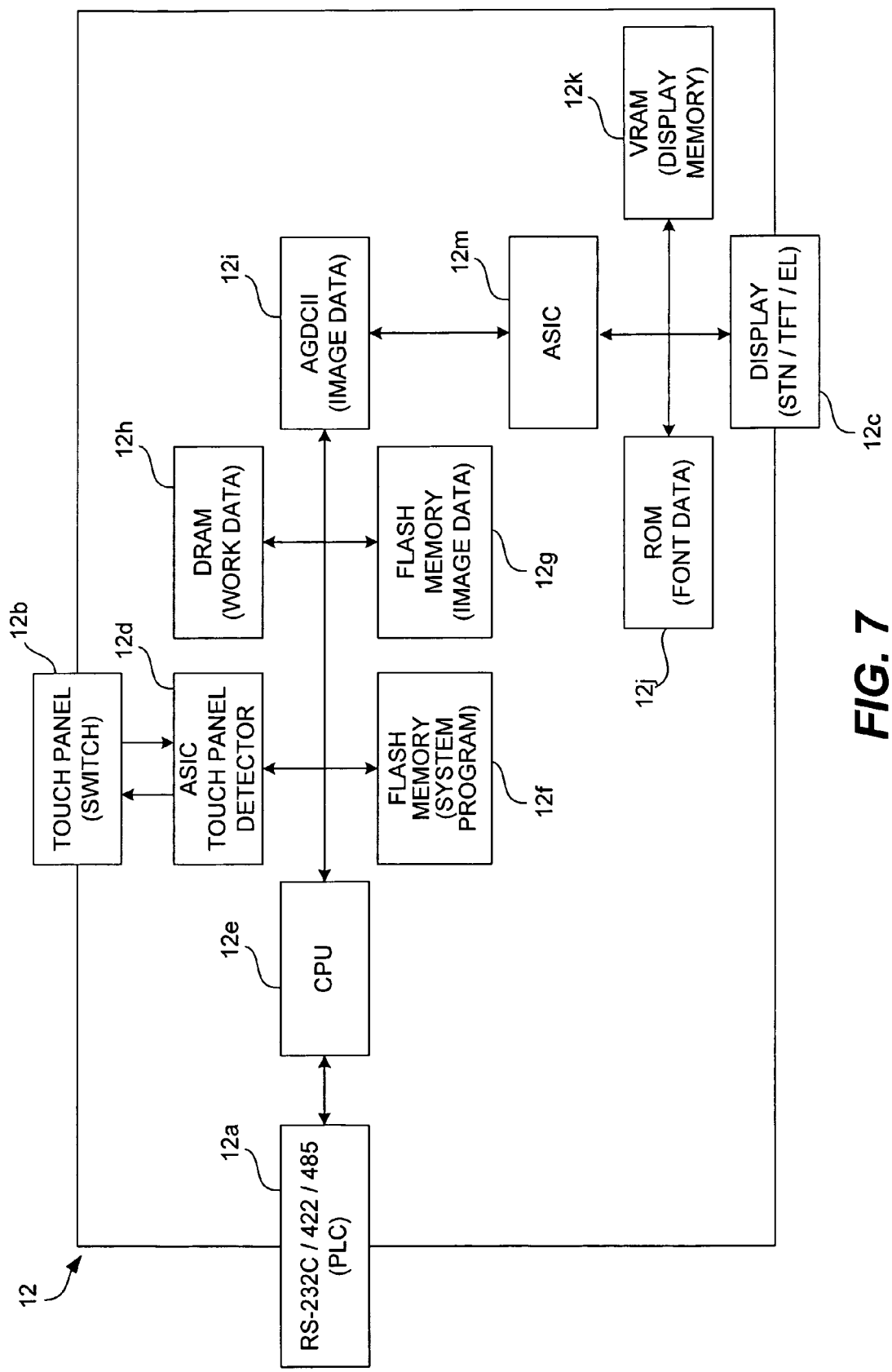
FIG. 7 is an example of block diagram of a programmable terminal (PT).

FIG. 7 shows an example of hardware structure for the PT 12 provided with a serial communication port 12a for connection to the network 15 as its interface, a touch panel 12b as a man-machine interface, and a display device 12c. Operations on the touch panel 12b are monitored by a touch panel detector 12d comprised of ASIC. As the user contacts a specified position on the touch panel 12b, the touch panel detector 12d detects it, determines which of its button areas has been touched and transmits its determination to a CPU 12e. Alternatively, the touch panel detector 12d may be adapted only to detect the coordinates of the position on the screen such that it is up to the CPU 12e to determine which of the button areas has been touched from the coordinates detected by the touch panel detector 12d.

The system software for operating and controlling the PT 12 and display data for the display device 12c are stored respectively in the flash memories 12f and 12g. The CPU 12e, which is a microprocessor for an overall control, reads out data from the PLC 10 and 11 whenever necessary while carrying out the system program stored in the flash memory 12f and displays the data on the display device 12c. A DRAM 12h storing various work data may be used conveniently while various programs are executed.

The display on the display device 12c is actually controlled by a display CPU 12i which serves to store image data retrieved from the flash memory 12g by a command from the CPU 12e as well as font data read out of a ROM 12j in a display memory (VRAM) 12k and to output such stored data to the display device 12c. Such data are read out and written in under the control of ASIC 12m. The CPU 12e also functions to transmit set information to specified ones of the PLC 10 and 11 according to inputs from the touch panel 12b.

At the time of a peripheral service process by a PLC 10 according to this invention, data are adapted to be exchanged with other apparatus through the general-purpose communication circuit network 15. For example, the parent station PLC 10 passes a token sequentially to the child stations (PLC 11, PLC 12, etc.) and the child station which has received the token transmits a command. Data are transmitted and received among PLC 10 and 11 by a data link format, while the PT 12 communicates with the parent station PLC 10 by command-response.

Figure 8:
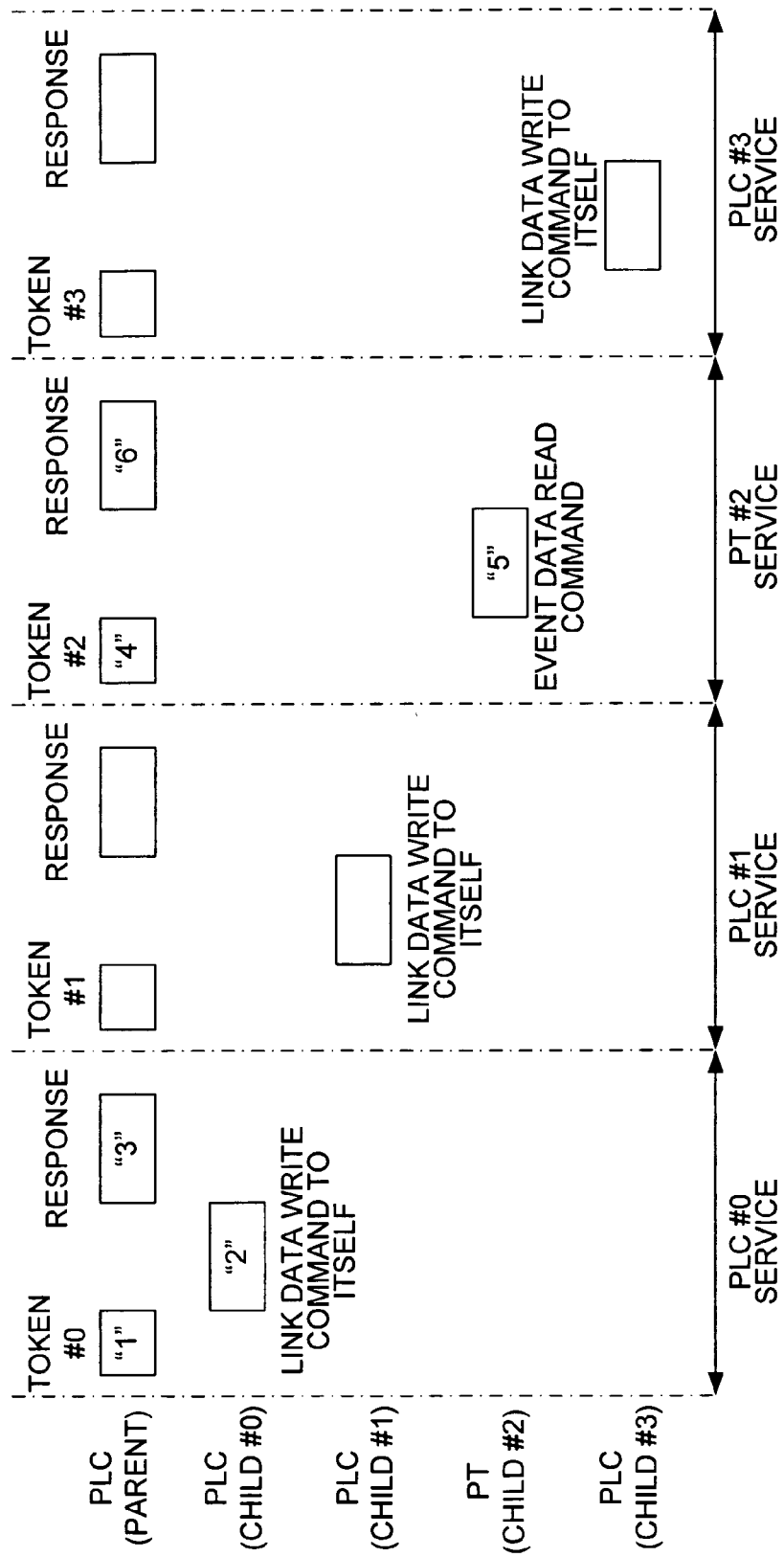
FIG. 8 is a diagram showing an example of operations by the network system.

Explained more in detail with reference to FIG. 8, the token is initially issued from the parent station to child station No. 0 ("1"). As it is received by child station No. 0, a write command into the data link area of itself (PCT No. 0) is issued to the parent station ("2"). The parent station, upon receiving this write command, stores the data sent from child station No. 0 in a specified memory area and returns link data of other stations as response ("3"). Child station No. 0, on the basis of this response, writes the received data in the data link area for other stations.

Next, the parent station repeats the same operation ("PLC #1 service") as described above (for "PCT #0 service") with the next child station (PLC No. 1). Thereafter, in "PT #2 service", the same operation is repeated with the next child station which, in this example, is the PT 12 (child station No. 2). Since it is by command-response communication between the PT 12 and the parent station PLC 10, this is done first with the parent station PLC 10 issuing the token to the PT 12 ("4"), the PT 12 as child station No. 2 receiving this token and outputting a read command to the parent station ("5") because an event has been generated, and the parent station returning the requested data to the PT 12 as response to this command ("6").

In this manner, the PT 12 can obtain data at any address in the memory area of the parent PLC. If data in the child PLC stations are preliminarily transmitted to the parent, these data can be transmitted to the PT 12 through the parent station. If the event is changed from a read command to a write command, data can be written into a specified memory area of the parent station.

Thereafter (in "PLC #3 service"), according to the example shown in FIG. 8, the same process is repeated with the next child station (PLC No. 3). When the service processes with all child stations are completed, the program returns to the service to the first child station (PCL No. 0).

Figure 9:
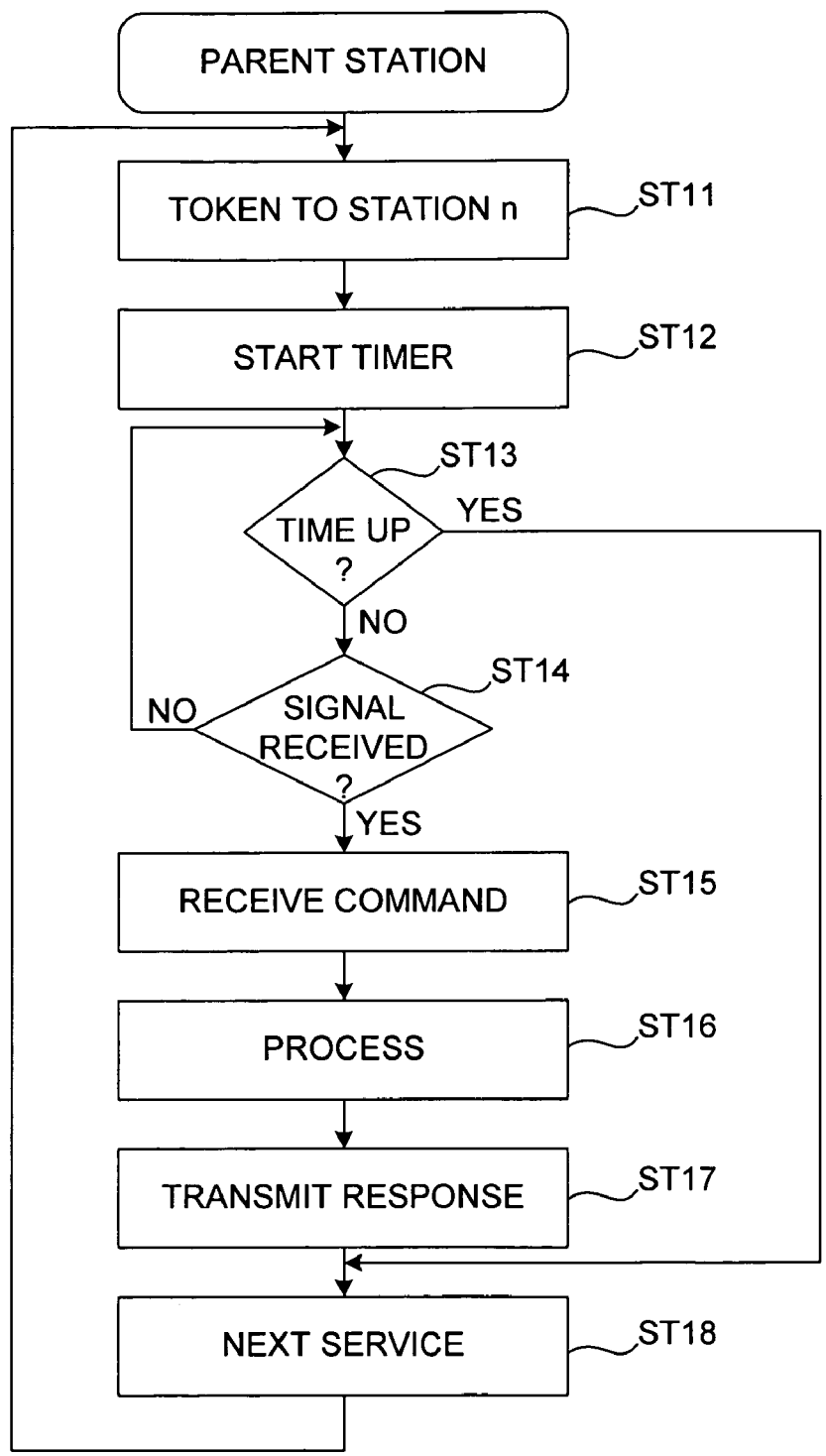
FIG. 9 is a flowchart for the operations of the parent station.
Figure 10:
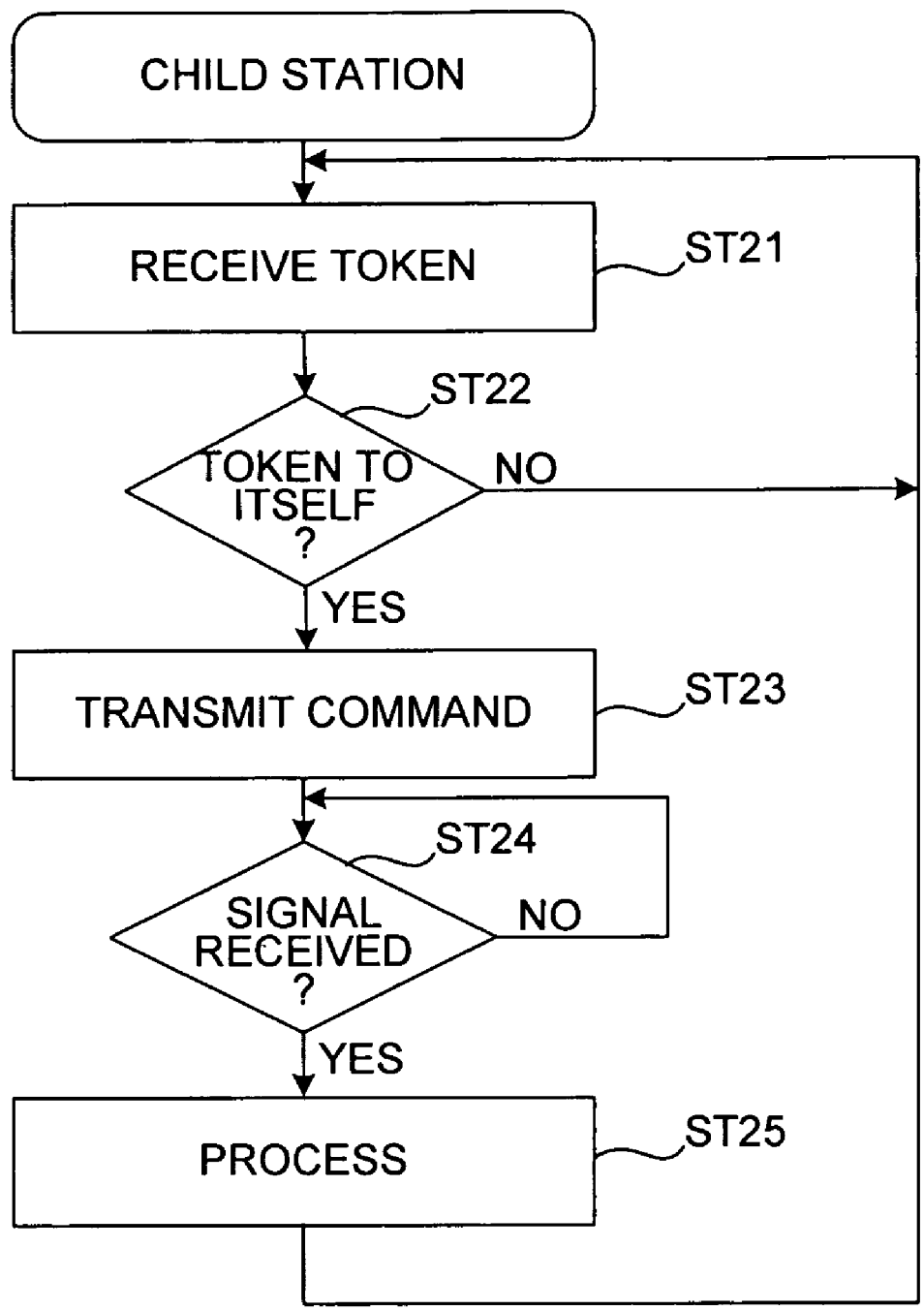
FIG. 10 is a flowchart for the operations of a child station.

FIGS. 9 and 10 show flowcharts that are executed by the MPU of the parent station 10 and that of PLC 11 or PT 12 for carrying out the process explained above with reference to FIG. 8. After the token is issued to a child station No. n (n being a dummy index) (Step ST11), a token monitoring timer is started and the program waits for any signal to be received until the specified monitoring time elapses (Steps ST12–ST14). If a signal is received during this monitoring time (YES in Step ST14), the content of the command is analyzed (Step ST15) and a process is carried out in response to the command (Step ST16). The result of the process is sent back to the sender of the command, that is, child station No. n currently in possession of the token (Step ST17).

If child station No. n is a PLC, the process in response to the command is to obtain therefrom data of other stations and the response transmission is to transmit such data of the other stations. If child station No. n is a PT, the process in response to the command, in the case where the content of the event is to read out data, is to obtain these data from the specified address and the process in the case of a write command is to store the transmitted data in the memory area with the specified address. Examples of response include communication regarding completion of a write operation.

After such a response has been transmitted, the program moves to the next child station as the object of service (or issues the token to the next child station) (Step ST18). In other words, n is replaced by n+1. If n exceeds the number of the child stations, n returns to zero.

On the side of a child station waiting for the token to be received (Step ST21), it is initially determined whether or not the received token is addressed to itself (Step ST22). If the received token is not for itself (NO in Step ST22), the station waits for the arrival of the next token. If the received token is for itself (YES in Step ST22), a specified command is transmitted (Step S23). In the case of a PLC 11, a command to write link data in itself is transmitted to the parent. In the case of a PT 12, an event data read command or an event data write command is transmitted to the parent station. When a response is received thereafter (YES in Step ST24), its content is analyzed and necessary processes such as writing in data are executed (Step ST25). This concludes the cycle of routines, and the program goes back to Step ST21.

FIG. 11 shows another example of operations, characterized wherein the mode of communication between the parent station PLC 10 and the PT 12 is different. In the example explained above with reference to FIGS. 8–10, an event command is generated between the parent station PLC 10 and the PT 12 such that a response thereto was obtained. In the second example, data are additionally exchanged therebetween by data link, a data link area being additionally reserved in the memory area of the PT 12.

Figure 11A:
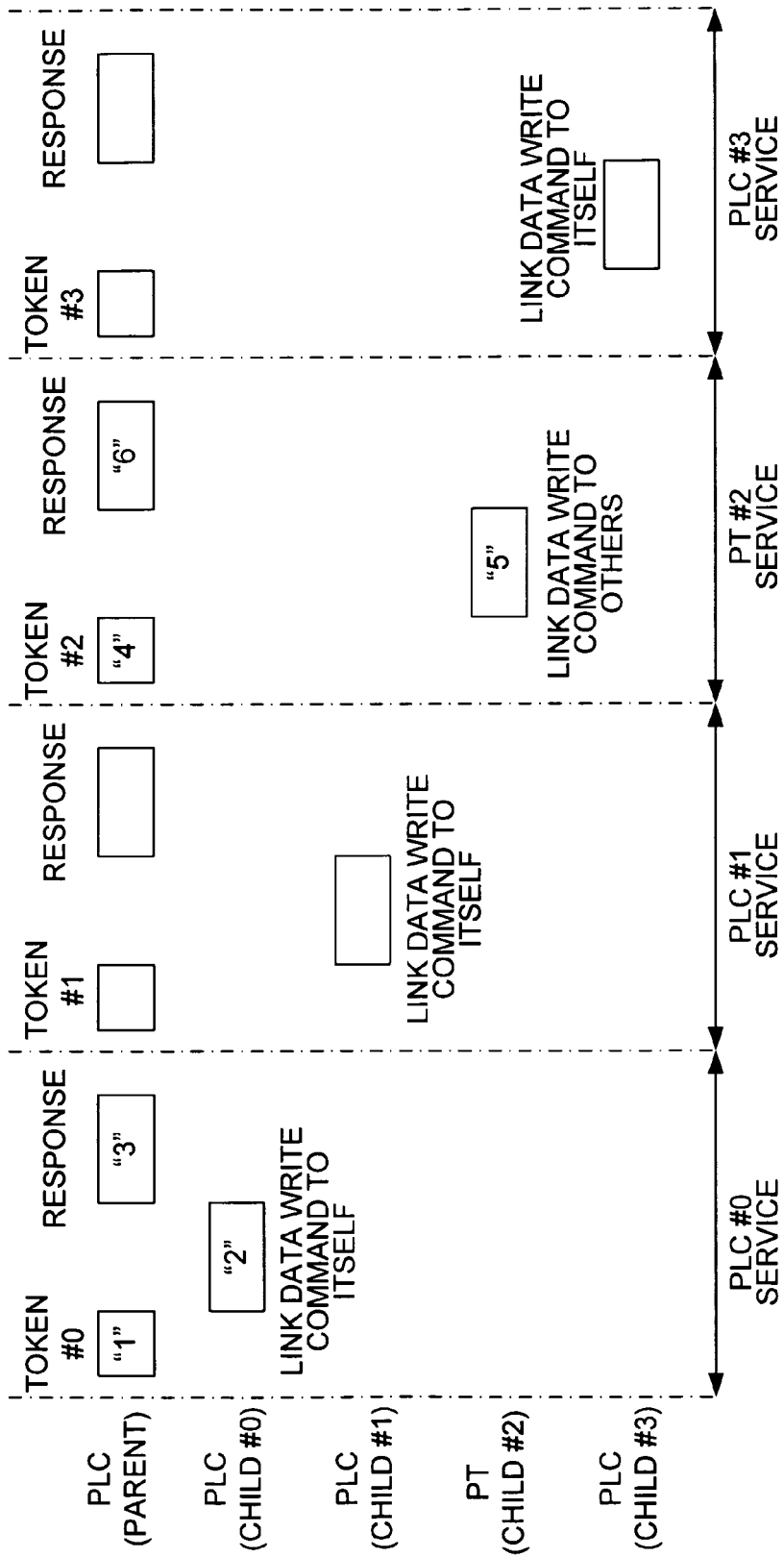
FIGS. 11A and 11B, together referred to as FIG. 11, are diagrams for showing a second example of operations by the network system.
Figure 11B:
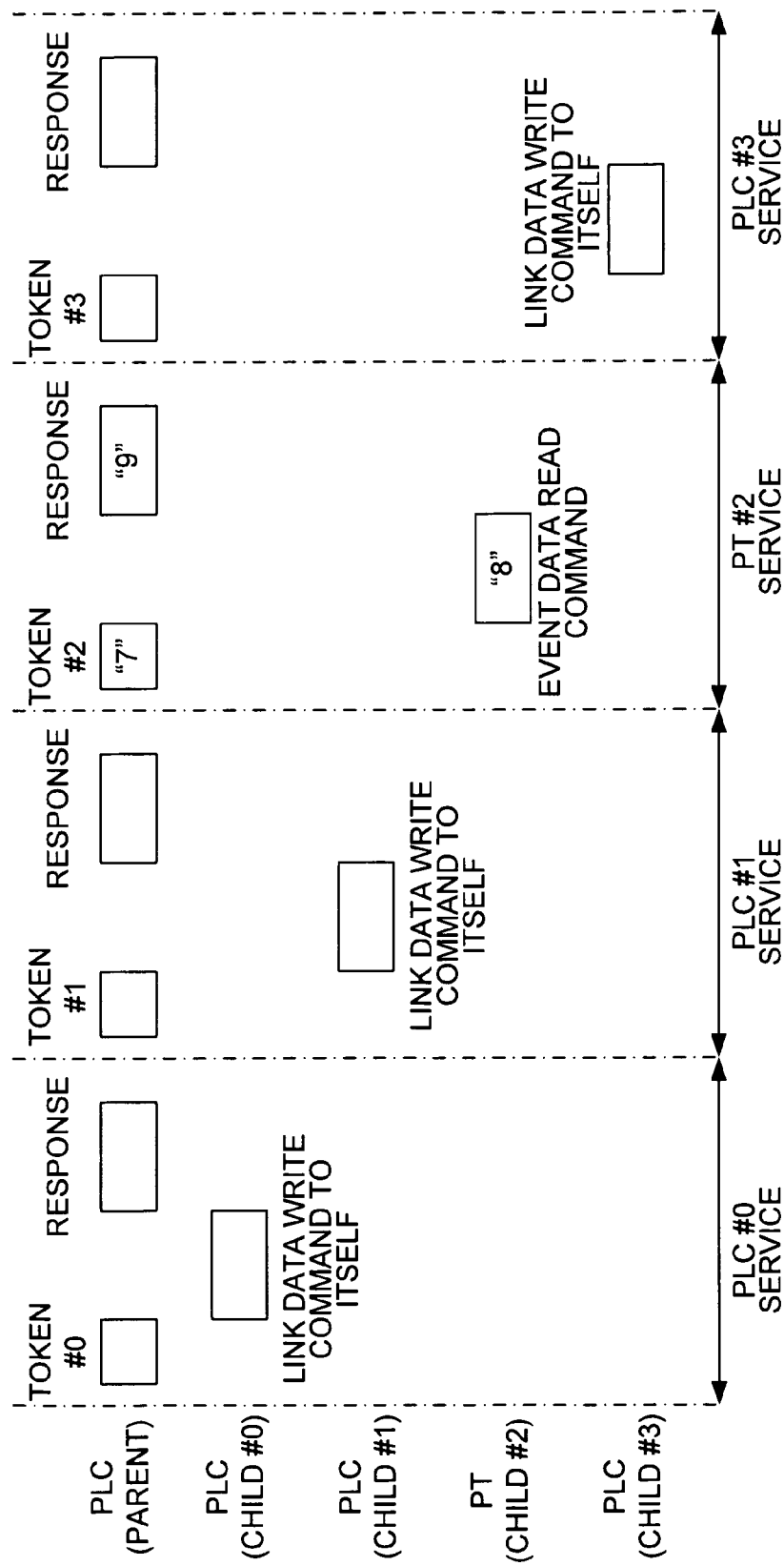

Thus, in the second example, the PT 12 carries out a data link mode (also referred to as the "second service process") illustrated in FIG. 11A and an event command-response mode (also referred to as the "first service process") illustrated by FIG. 11B in a specified order (such as alternately). FIG. 11A shows a mode wherein data are exchanged by data link between the parent station PLC 10 and all of the child stations, and FIG. 11B is essentially identical to FIG. 8.

The mode illustrated by FIG. 11A starts by the parent station issuing the token to child station No. 0 ("1"). As the token is received by child station No. 0, the write command for its own link data (in the link data of PLC #0) is transmitted to the parent station ("2"). Upon receiving this write command, the parent station saves the received data in a specified memory area and also returns the link data of the other stations in response to the command ("3"). On the basis of this response, child station (No. 0) writes the received data in the data link area for the other stations.

The parent station then carries out a similar process for the next child station (No. 1). After this is done, the parent station proceeds to the process for the third child station (No. 2). In this example, the third child station (No. 2) is a PT. The parent station issues a token to the PT (child station No. 2) ("4"). Upon receiving this token, the PT (child station No. 2) issues a write command for the link data (in its own data link area) to the parent station ("5"). Upon receiving the write command, the parent station saves the transmitted data in a specified area and returns the link data of the other stations to the PT (child station No. 2) as response ("6"). On the basis of this response, the PT (child station #2) writes the received data in the data link area for the other stations.

According to this example, the processes "1"–"3" are thereafter repeated to the fourth child station (No. 3). After service processes to all child stations connected to the network 15 are completed, the program returns to the service process to the first child station (No. 0).

The next cycle starting with the first child station (No. 0) may be according to the diagram shown in FIG. 11B. The routine shown in FIG. 11B is essentially the same as that explained above with reference to FIG. 8 and hence will not be described repetitiously.

Regarding the above description of the second example, the processes by the MPU and CPU of the parent and child stations are the same as explained above with reference to the flowcharts of FIGS. 9 and 10, except that Step ST23 of FIG. 10 depends on which of the processes is being carried out.

Figure 12:
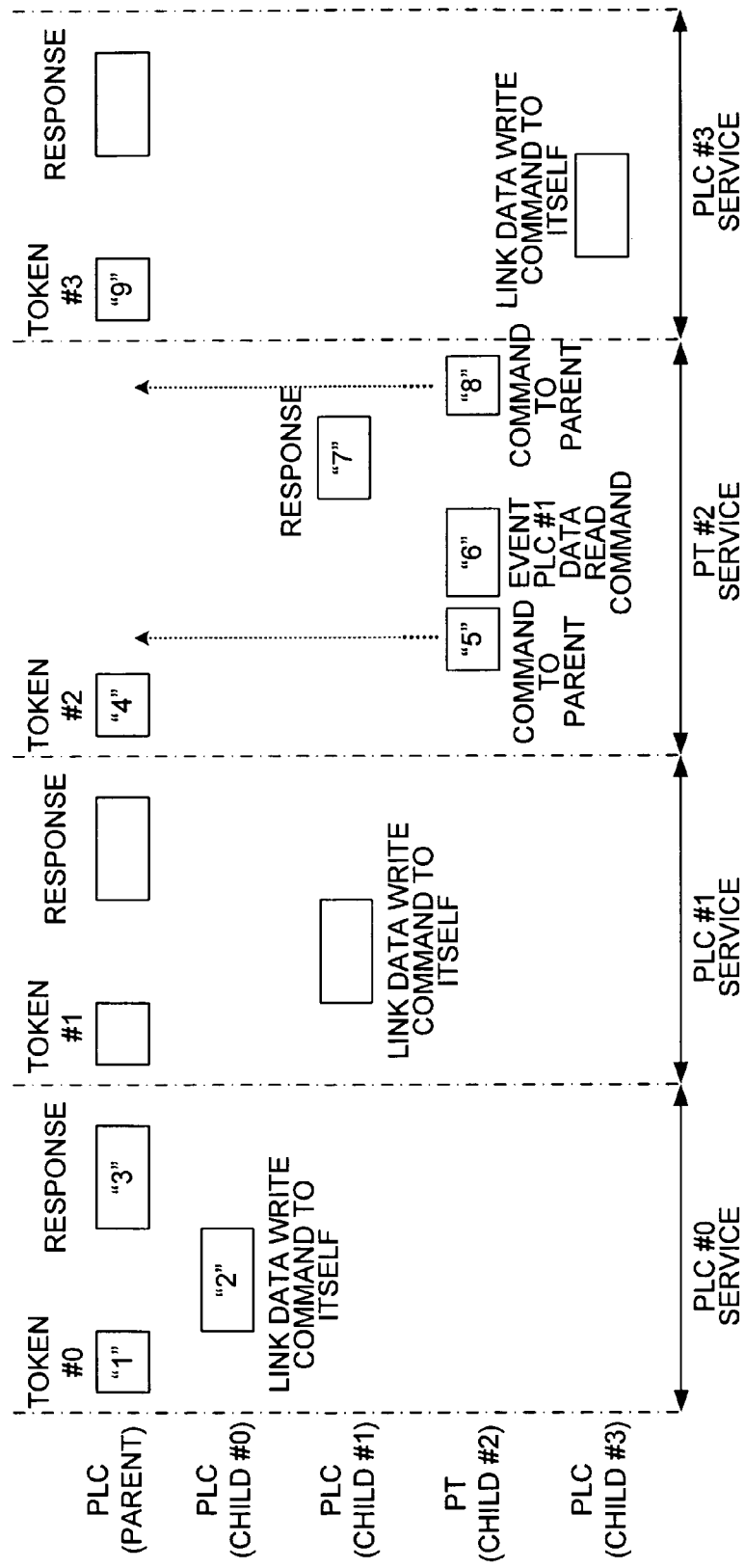
FIG. 12 is a diagram for showing a third example of operations by the network system.

FIG. 12 shows a third example of operations, characterized wherein the mode of communication with the PT 12 is varied such that direct communications are enabled between the PT 12 and the PLC 11 while the PT 12 in the first and second examples described above was adapted to communicate only with the parent station PLC 10.

As shown in FIG. 12, the token is initially issued from the parent station to child station No. 0 ("1"). As it is received by child station No. 0, a write command into the data link area of itself (PCT No. 0) is issued to the parent station ("2"). The parent station, upon receiving this write command, stores the data sent from child station No. 0 in a specified memory area and returns link data of other stations as response ("3"). Child station No. 0, on the basis of this response, writes the received data in the data link area for other stations. This series of processes #1, #2 and #3 is the same as explained above with reference to FIG. 8.

Next, the parent station repeats the same operation ("PLC #1 service") as described above (for "PCT #0 service") with the next child station (PLC No. 1). Thereafter, in "PT #2 service", the token is issued from the parent to the next child station ("4") which is the PT 12 (child station No. 2) in this example. As the token is received by child station No. 2, since an event is taking place now, a command to wait for the token is issued to the parent station ("5"). Upon receiving this command, the parent station remains in the wait condition for the release from this condition, say, by stopping the operation of its timer for monitoring the receipt of the token. In the meantime, child station No. 2 issues a data read command to a specified PLC (child station No. 1 in this example) ("6"). It is to be noted that in the examples described above, it was to the parent station that such an event command was issued. In the present example, it is to another child station that an event command is outputted. In other words, such an event command may be transmitted according to this invention either to the parent station or to another child station. The event command may be a read command for having data written into a specified memory area of the PLC.

As such an event command is received (by child station No, 1 in this example), the addressed child station responds by returning the requested data to the PT (child station No. 2) ("7"). As this response is received and this event is concluded, the PT issues a release command to the parent to release it from its wait condition ("8"). Upon receiving this release command, the parent station learns that the command-response process between the child stations Nos. 1 and 2 has ended and repeats the processes of "1", "2" and "3" with the next child station (No. 3) by sending the token ("9"). When the services to all of the child stations connected to the network 15 are completed, the program returns to the service to the first PLC (child station No. 0).

Figure 13:
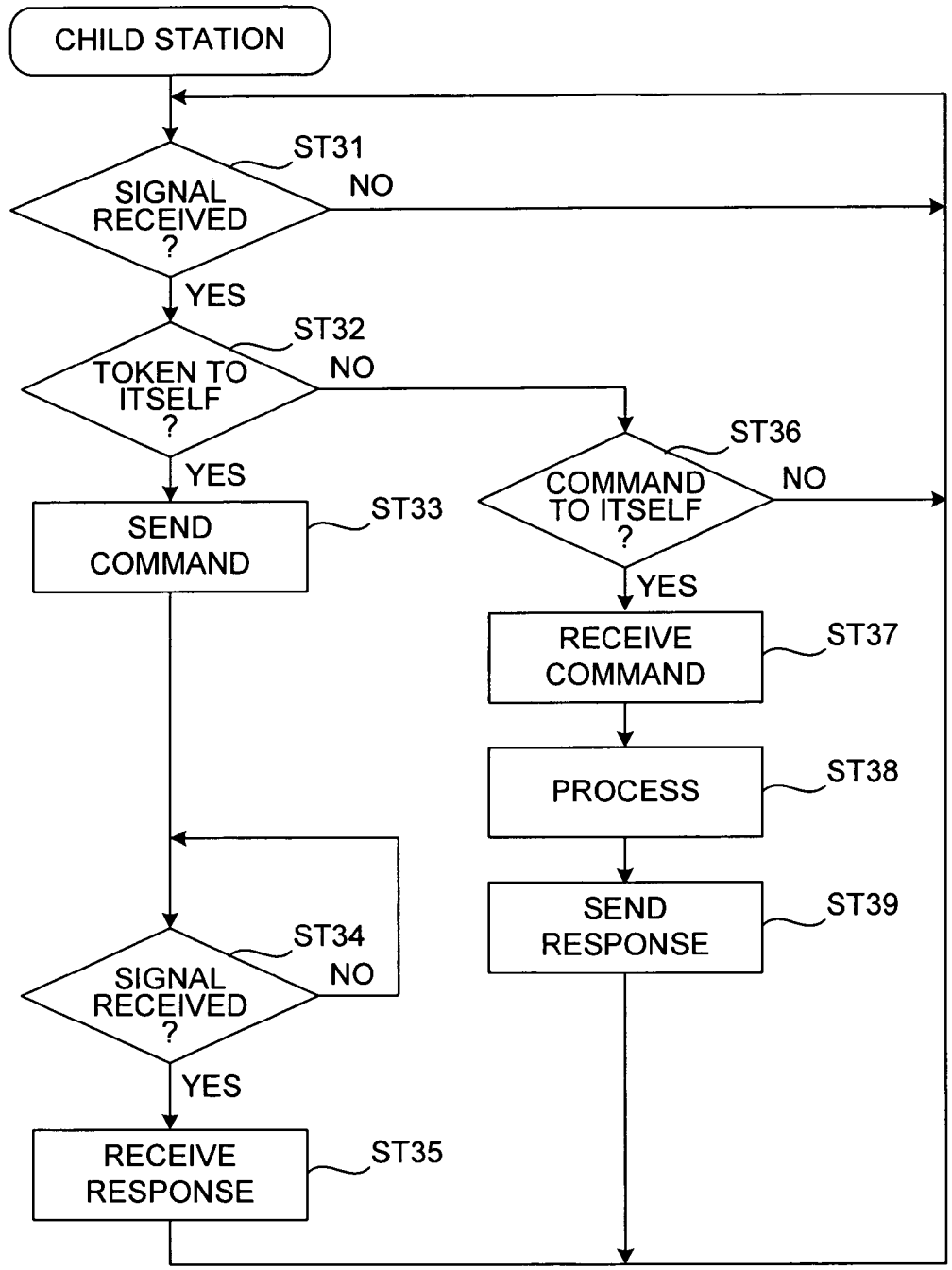
FIG. 13 is a flowchart for the operations of a child PLC station in the third example.

The operations by each of the PLC 11 in this example are shown by the flowchart of FIG. 13. When the token is received (YES in Step ST31), it is determined whether this token is addressed to itself (Step ST32). If the token is to itself (YES in Step ST32), the station outputs a write command for a data link (Step ST33) and waits for a response (Step ST34). After data of another station are received from the parent station as a response (Step ST35), they are written in a specified area. This series of processes is the same as explained with reference to FIG. 10. If the received token is not addressed to itself (NO in Step ST32), it is determined whether the command is addressed to itself or not (Step ST36). If the command is not to itself (NO in Step ST36), no process will be carried out. If the command is to itself (YES in Step ST36) although the token is not addressed to itself, the content of the command is analyzed (Step ST37) and a process is carried out according to the command (Step ST38). Thereafter, the result of the process which has been carried out is transmitted to the issuer of the command, that is, the child station which is now in possession of the token (Step ST39).

Figure 14:
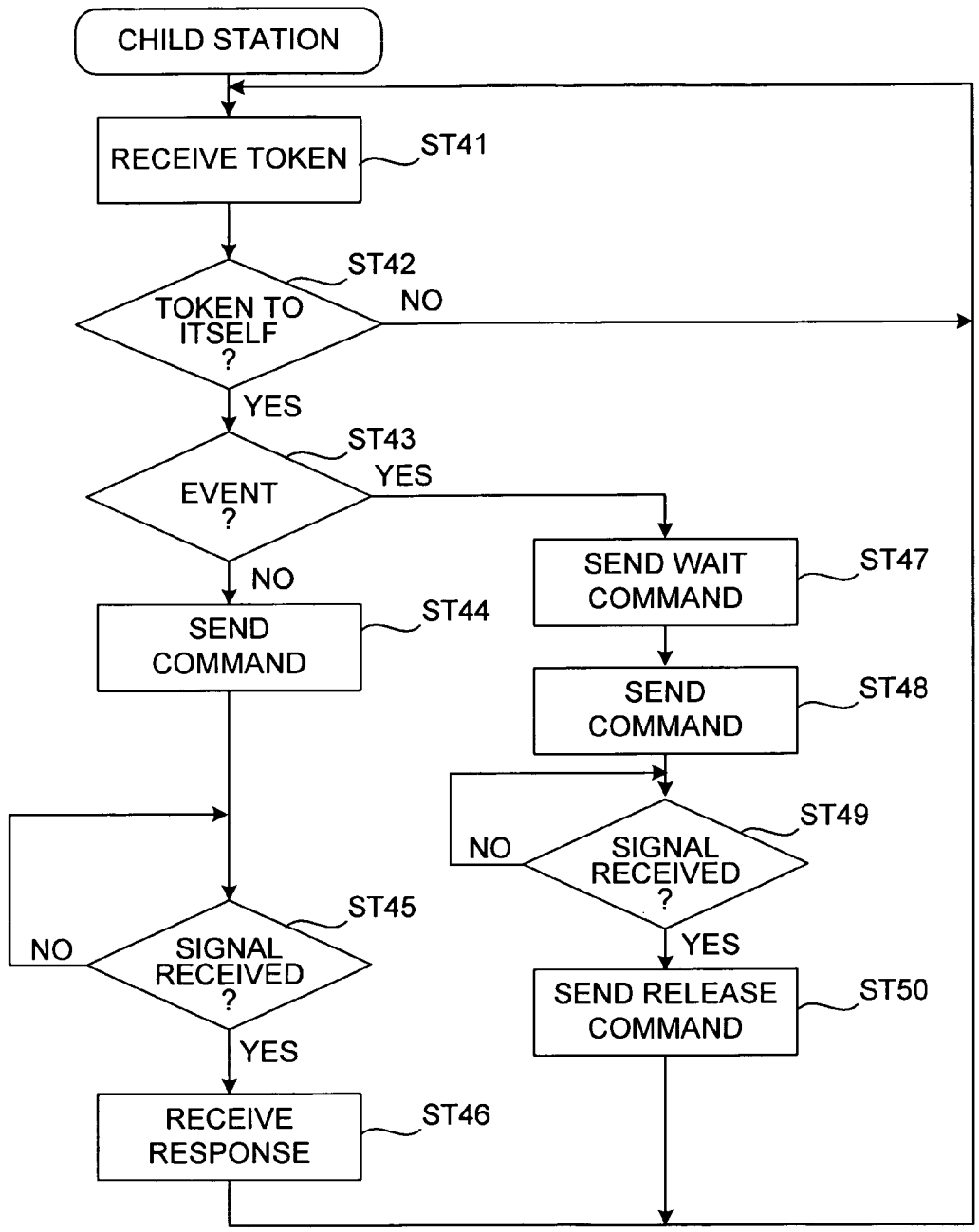
FIG. 14 is a flowchart for the operations of a child PT station in the third example.

The operations by the PT (child station No. 2) in this example are shown by the flowchart of FIG. 14. As the token is received (Step S41), it is determined whether the received token is for itself or not (Step ST42). If the received token is addressed to itself (YES in Step ST42), it is determined whether or not there is an event addressed to another child station, that is, whether or not a command-response communication is going to take place as an event with another child station (Step ST43). If such a communication is to take place (YES in Step ST43), a wait command is outputted to the parent station to wait for the token (Step ST47). Next, a command to read data is transmitted to a specified child station (Step ST48) and the PT enters a wait period until a response is received to this command (Step ST49). When this response is received (YES in Step ST49), a release command is sent to the parent station (Step ST50) to release the parent station from the wait condition. If it is determined in Step ST43 that there is no event, a command-response communication is to take place with the parent station. Thus, the PT transmits to the parent station a command to read data (Step ST44) and waits until a response is received (Step ST45). When data are received from the parent as a response (YES in Step ST45), the received data are written in a specified memory area of itself (Step ST46).

Figure 15:
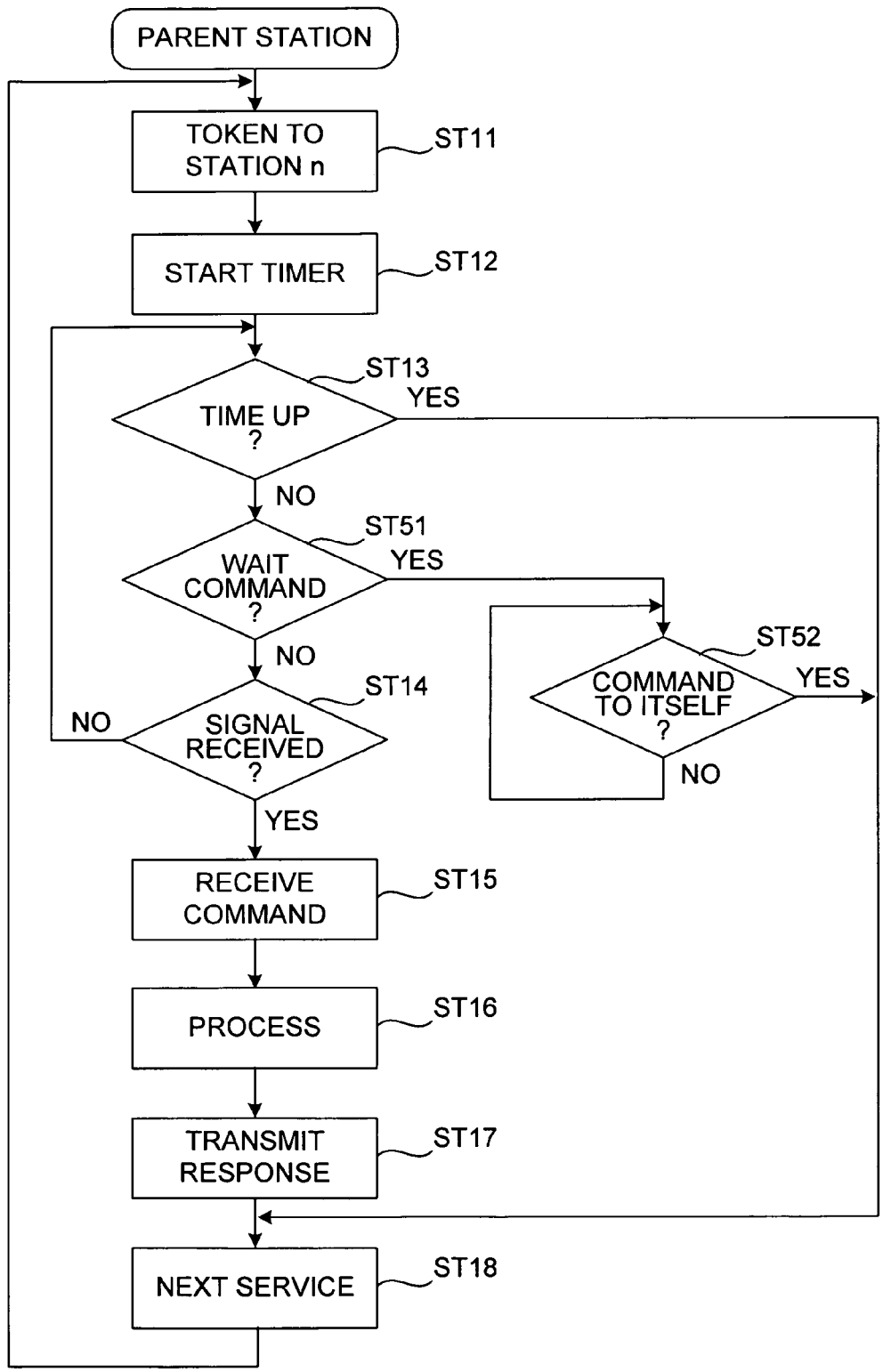
FIG. 15 is a flowchart for the operations of the parent station in the third example.

The operations by the parent station in this example are shown by the flowchart of FIG. 15, which is similar to the flowchart shown in FIG. 9 and hence identical or like steps are indicated therein by the same step numbers and will not be repetitiously explained. As shown in FIG. 15, after the parent station issues the token to a child station and starts its timer (Step ST12), if it receives a wait command from the child station (YES in Step ST51) before the timer counts up the set time, it understands that the child station is going to start a command-response communication as an event and stops the timer and enters a wait period until a release command is received (YES in Step ST52).

Figure 16:
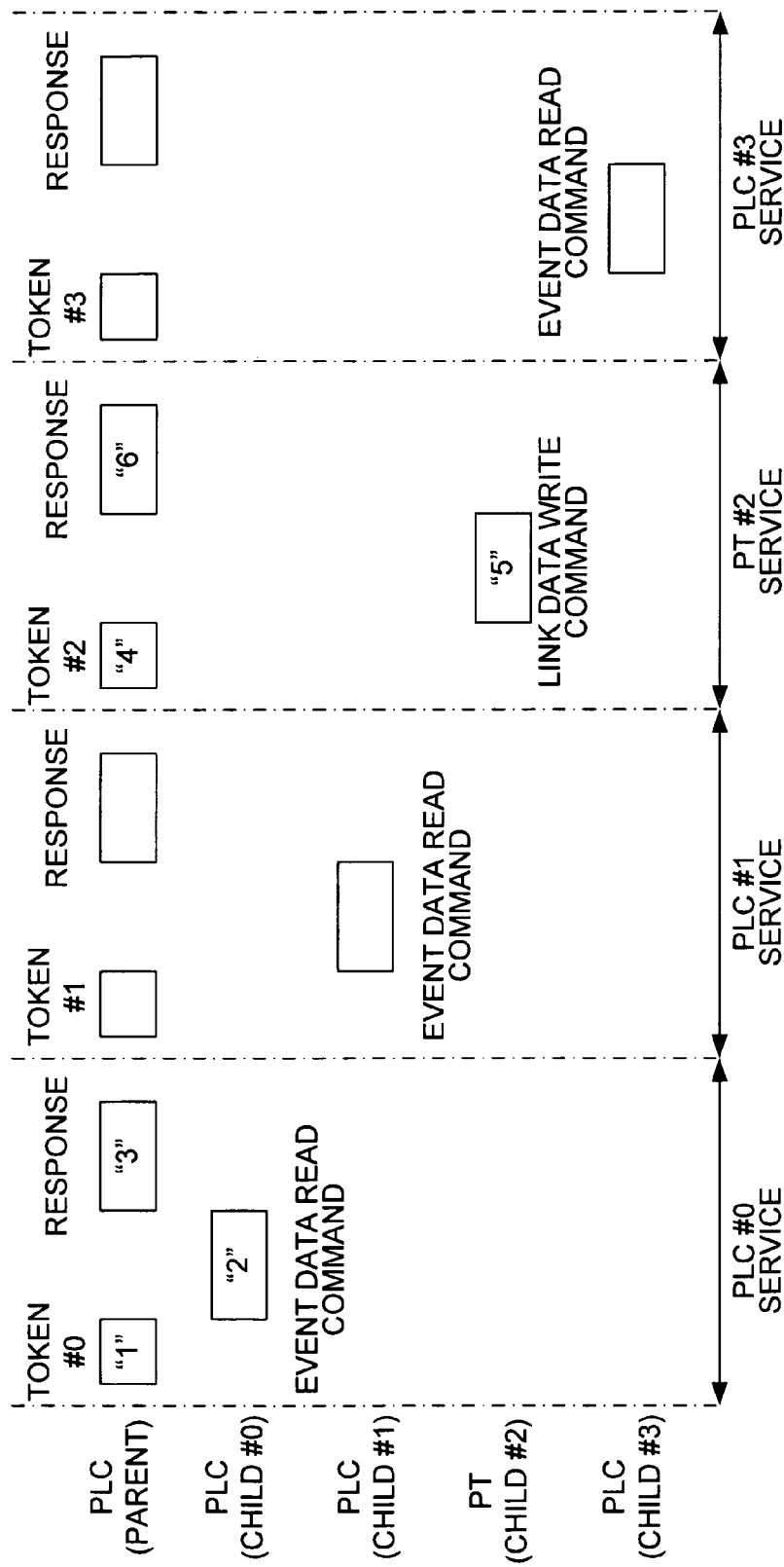
FIG. 16 is a diagram for showing a fourth example of operations by the network system.

FIG. 16 shows a fourth embodiment of the invention wherein a network is formed as shown in FIG. 3 but the parent PLC station and the child PLC stations are adapted to output event commands and to receive response thereto while data are exchanged by data link between the parent station and the PT child station. In this example, as the parent station issues the token to child station No. 1 ("1") and it is received by child station No. 1, a command to read data is transmitted to the parent station ("2") since there is an event which is taking place. The parent then responds by returning the requested data to child station No. 0 ("3"). After a similar series of processes is then repeated with child station No. 1, the next service process to the PT child station (No. 2) is started with the parent station issuing the token ("4"). As the token is received by the PT, a write command for link data in its own data link area is transmitted to the parent station ("5"). Upon receiving this command, the parent station stores the data received from the PT in a specified memory area and also returns link data of other stations (child stations with data link functions (not shown)) to the PT as a response ("6"). On the basis of the response, the PT writes the received data in the data link area for the other stations.

Thereafter, the processes #1, #2 and #3 explained above are repeated with the next child station (No. 3). When the services to all of the child stations connected to the network 15 are completed, the program returns to the service to the first PLC (child station No. 0). The operations by the MPU and CPU of the parent and child stations in this example are as shown in FIGS. 9 and 10.

Figure 17:
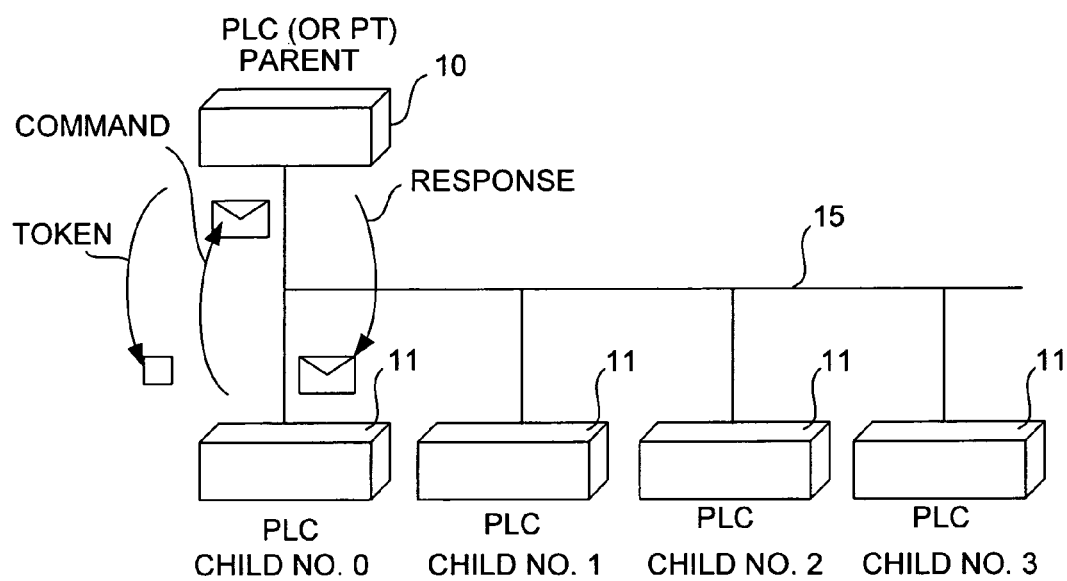
FIG. 17 is a diagram showing a fifth example of network system embodying this invention.

FIG. 17 shows a fifth embodiment of the invention characterized wherein event commands are generated and responses thereto are obtained by the parent PLC station and some of child PLC stations while data are exchanged between the parent station and the rest of the child PLC stations by data link operations. As shown in FIG. 18, the token is initially issued from the parent station to child station No. 0 ("1"). As it is received by child station No. 0, a write command into the data link area of itself (PCT No. 0) is issued to the parent station ("2"). The parent station, upon receiving this write command, stores the data sent from child station No. 0 in a specified memory area and returns link data of other stations as response ("3"). Child station No. 0, on the basis of this response, writes the received data in the data link area for other stations.

Next, the parent station repeats the same operation ("PLC #1 service") as described above (for "PCT #0 service") with the next child station (PLC No. 1). Thereafter, the operations are carried out with the next child station (No. 2). Since the communication between the parent station and child station No. 2 is by command-response communication, the token is initially sent from the parent station to child station No. 2 ("4"). Upon receiving the token, child station No. 2 outputs a data read command to the parent station since there is an event which is taking place ("5"). Upon receiving this command, the parent station returns the requested data of the parent station to child station No. 2 as a response ("6"). Thus, child PLC station No. 2 can obtain data at any address in the memory area of the parent station.

Thereafter, the operations #1, #2 and #3 are repeated to child station No. 3. When the services to all of the child stations connected to the network 15 are completed, the program returns to the service to the first PLC (child station No. 0). The operations by the MPU of the parent are as shown in FIG. 9. Those of the MPU and CPU of the PLC 11 of the child stations are as shown in FIG. 10.

In all of the examples described above, a PLC played the role of the parent station but this is not intended to limit the scope of the invention. The merits of the invention can be attained also by making a PT to be the parent station. Such an application is shown in FIG. 17 by replacing the parent PLC station by a parent PT station (shown in parentheses). The functions of such substitute parent PT station will be the same as those of the parent PLC station 10 as explained above in the embodiments described above. This is to say that it is provided with the functions of issuing a token, carrying out command-response communications as events with some of the child stations and exchanging data by data link operations with the rest of the child stations. In this case, the network may comprise more than one PT, one of them becoming the parent station and the other (or others) each serving as a child station. Data may be exchanged between the parent PT and any child PT station either through event or data link communications. It is preferable to preliminarily determine which mode of communications is to be used.

In summary, the invention relates to a network structured with both programmable controllers and display devices, or only programmable controllers and without any programmable display devices, connected to a single general-purpose serial communication circuit wherein both data link communications and command-response communications as events can be used mixed together. Thus, the network structure is simplified and such a network system can be used with an apparatus provided with only one serial communication port.

What is claimed is:

1. A network system comprising;

a single general-purpose serial communication circuit; and a plurality of programmable controllers connected to said general-purpose serial communication circuit, one of said programmable controllers being a parent station, the rest of said programmable controllers being each a child station, each one of said child stations being adapted to transmit a command when a token issued by said parent station is received thereby;

wherein, if said command is a link data write command for transmitting link data to said parent station, said parent station stores said link data at a preliminarily specified link data storing area within said parent station and transmits a link data write response whereby the link data of all said child stations are transmitted and when said link data write response from said parent station is received, the child station writes said link data in a preliminary specified link data storing area within said child station; and wherein, if said command is an event data read command for reading out specified data at a specified one of said programmable controllers, said specified one of the programmable controllers transmits a data read response including said specified data, and the child station which received said data read response stores said specified data in a specified area.

2. The network system of claim 1 wherein said link data write command is outputted from a system program of said programmable controllers, not through a user program.

3. The network system of claim 1 wherein one of said child stations is a programmable display device, said programmable display device serving to transmit said link data write command and said even data read command.

4. The network system of claim 2 wherein one of said child stations is a programmable display device, said programmable display device serving to transmit said link data write command and said even data read command.

5. A network system comprising;
a single general-purpose serial communication circuit; and
a programmable display device which serves as a parent station and a plurality of programmable controllers each serving as a child station, each one of said child stations being adapted to transmit a command when a token issued by said parent station is received thereby;
wherein, if said command is a link data write command for transmitting link data to said parent station, said parent station stores said link data at a preliminarily specified link data storing area within said parent station and transmits a link data write response whereby the link data of all said child stations are transmitted and when said link data write response from said parent station is received, the child station writes said link data in a preliminary specified link data storing area within said child station; and
wherein, if said command is an event data read command for reading out specified data at a specified one of said programmable controllers, said specified one of the programmable controllers transmits a data read response including said specified data, and the child station which received said data read response stores said specified data in a specified area.

6. The network system of claim 5 wherein said link data write command from a system program of said programmable controllers, not through a user program.

7. A method of network system communication, said method comprising the steps of:
connecting a plurality of programmable controllers to a single general-purpose serial communication circuit, one of said programmable controller being a parent station, the rest of said programmable controllers being child stations, said parent issuing a token to be received by one of said child stations, said one child station that received said token sending a command to said parent station, and said parent returning a response corresponding to said command to said one child station;
causing said parent station, if said command is a link data write command for transmitting link data to said parent station, to store said link data at a preliminarily specified link data storing area within said parent station and transmits a link data write response whereby the link data of all said child stations are transmitted;
causing the child station, when said link data write response from said parent station is received, to write said link data in a preliminary specified link data storing area within said child station;
causing, if said command is an event data read command for reading out specified data at a specified one of said programmable controllers, said specified one of the programmable controllers to transmit a data read response including said specified data and the child station which received said data read response to store said specified data in a specified area.

8. The method of claim 7 wherein said link data write command is outputted from a system program of said programmable controllers, not through a user program, and wherein said event data read command is outputted when a specified command written in said user program is carried out.

9. The method of claim 7 wherein one of said child stations is a programmable display device, said programmable display device serving to transmit said link data write command and said even data read command.

10. The method of claim 8 wherein one of said child stations is a programmable display device, said programmable display device serving to transmit said link data write command and said even data read command.

11. A method of network system communication, said method comprising the steps of:
connecting a plurality of programmable controllers and one or more programmable display devices to a single general-purpose serial communication circuit, one of the programmable display devices being a parent station, the rest of the programmable display devices and said programmable controllers each being a child station,
causing said parent station, if said command is a link data write command for transmitting link data to said parent station, to store said link data at a preliminarily specified link data storing area within said parent station and transmits a link data write response whereby the link data of all said child stations are transmitted;
causing the child station, when said link data write response from said parent station is received, to write said link data in a preliminary specified link data storing area within said child station;
causing, if said command is an event data read command for reading out specified data at a specified one of said programmable controllers, said specified one of the programmable controllers to transmit a data read response including said specified data and the child station which received said data read response to store said specified data in a specified area.

12. The method of claim 11 wherein said link data write command is outputted from a system program of said programmable controllers, not through a user program.

* * * * *